US006538353B2

(12) United States Patent
Marioni

(10) Patent No.: US 6,538,353 B2
(45) Date of Patent: Mar. 25, 2003

(54) PERMANENT-MAGNET ELECTRIC MOTOR FOR CIRCULATION PUMPS OF HEATING SYSTEMS

(75) Inventor: Elio Marioni, Dueville (IT)

(73) Assignee: Askoll Holding S.r.l., Dueville (IT)

( * ) Notice: Subject to any disclaimer, the term of this patent is extended or adjusted under 35 U.S.C. 154(b) by 0 days.

(21) Appl. No.: 10/009,724

(22) PCT Filed: Apr. 20, 2001

(86) PCT No.: PCT/EP01/04539
§ 371 (c)(1),
(2), (4) Date: Dec. 17, 2001

(87) PCT Pub. No.: WO01/84690
PCT Pub. Date: Nov. 8, 2001

(65) Prior Publication Data
US 2002/0158545 A1 Oct. 31, 2002

(30) Foreign Application Priority Data
Apr. 27, 2000 (IT) ......................................... PD00A00107

(51) Int. Cl.[7] .............................. H02K 5/12; H02K 5/00
(52) U.S. Cl. .............................. 310/89; 310/88; 310/86; 310/89
(58) Field of Search .............................. 310/86, 87, 89, 310/88; 417/423.3; 415/203, 55.1

(56) References Cited

U.S. PATENT DOCUMENTS

| 4,247,265 A | 1/1981 | Vittorio |
| 6,365,998 B1 * | 4/2002 | Kech ........................... 310/194 |

FOREIGN PATENT DOCUMENTS

| DE | A-195 18 215 | 11/1995 |
| GB | A-2 026 780 | 2/1980 |

OTHER PUBLICATIONS

Patent Abstracts of Japan vol. 008, No. 226 (E–272), Oct. 17, 1984 & JP 59 106843 A (Mitsubishi Denki KK) Jun. 20, 1984 abstract; figures 1,2.

* cited by examiner

Primary Examiner—Tran Nguyen
Assistant Examiner—Iraj A Mohandesi
(74) Attorney, Agent, or Firm—Guido Modiano; Albert Josif; Daniel O'Byrne

(57) ABSTRACT

A permanent-magnet electric motor for circulation pumps of heating systems, comprising a stator (10) composed of a pack of metallic laminations (11) which form pole shoes (12) to which electrical windings (14) are coupled. A permanent-magnet rotor is arranged in a chamber which is separated with a watertight seal from the stator (10). The chamber that contains the rotor has a cross-section which is shaped so as to duplicate the contour of the pole shoes (12) in regions affected by the pole shoes (12) and so as to form wider portions in regions that are not affected by the pole shoes (12).

20 Claims, 4 Drawing Sheets

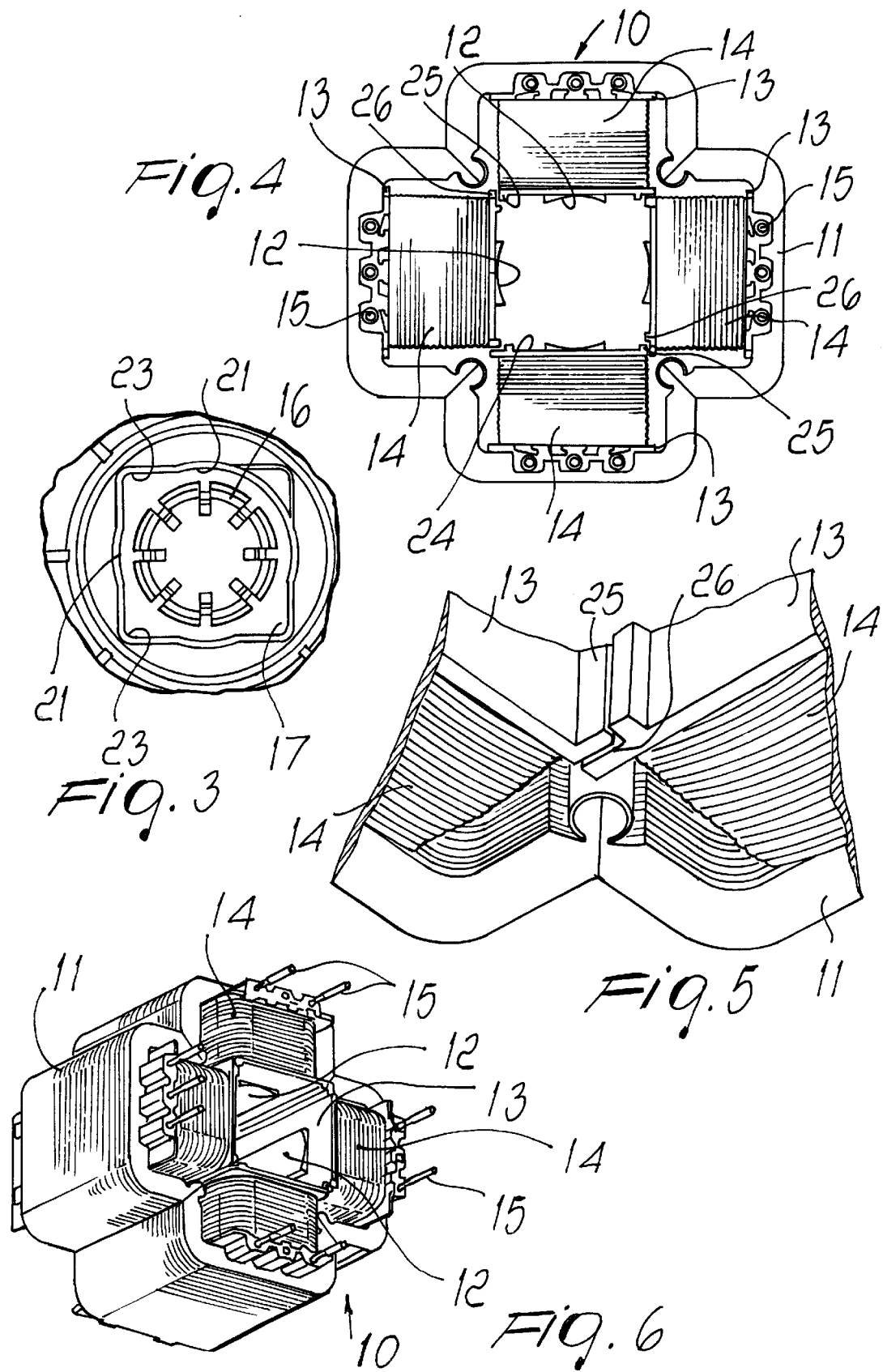

PERMANENT-MAGNET ELECTRIC MOTOR FOR CIRCULATION PUMPS OF HEATING SYSTEMS

BACKGROUND OF THE INVENTION

The present invention relates to a permanent-magnet electric motor for circulation pumps of heating systems.

The circulation pumps of heating systems are currently substantially constituted by a centrifugal pump coupled to an asynchronous. electric motor.

The stator is substantially composed of a toroidal lamination pack to which electric windings are coupled.

The rotor is constituted by a shaft and by a lamination pack to which the shaft is coupled.

The lamination pack accommodates a squirrel-cage circuit.

The rotor is immersed in a fluid to be forced into the system and therefore, in order to avoid corrosion of the metallic parts, particularly of the lamination pack (since the conductors of the squirrel-cage circuit are made of copper), the rotor is protected by means of a stainless steel jacket.

The rotor is arranged in a cylindrical chamber which is separated with a watertight seal from the stator and is usually formed by a metallic tubular element.

It is known that for good operation of asynchronous motors, the gap between the rotor and the stator must be reduced to a minimum.

In known motors, the gap has minimum limits which are constituted in practice by the thickness of the metallic tubular element forming the rotation chamber of the rotor, by the stainless steel jacket protecting the rotor, and by the space required (mainly dependent on machining tolerance) between the rotor and the tubular element.

The fundamental need to minimize the gap in circulation pumps of heating systems, however, clashes with the need to adequately dissipate the heat produced by the stator windings, bearing also in mind that the temperature of the circulation water can be as high as 95° C.

The rotor is immersed in water due to the connection of its chamber to the chamber of the impeller, but the fluid film that forms between the rotor and the walls of the chamber is too small to allow an adequate heat exchange between the stator and the water.

Furthermore, the fact that the space between the rotor and the chamber is inevitably limited entails the real possibility of rotor jamming, mainly due to dirt which can infiltrate into the empty spaces.

Another consequence is insufficient evacuation of the air bubbles that form especially during the installation and filling of the hydraulic circuit and subsequently when the pressure increases due to the temperature.

The presence of air inside the pump is annoying because it generates noise and most of all may seriously compromise the duration of the bushes that support the rotor shaft.

For this reason, known motors have a vent screw placed in the rear part of the rotor chamber.

The screw is also meant to release the rotor when dirt prevents it from rotating.

Furthermore, the fact that the element for separating the fluid circulating in the rotor chamber and the active parts of the stator (iron, copper) is made of a material which is not electrically insulating forces the manufacturer to ground the electric circuit, with obvious constructive complications which affect costs.

SUMMARY OF THE INVENTION

The aim of the present invention is to provide an electric motor for circulation pumps of heating systems having such a structure which allows to eliminate or substantially reduce the problems noted above in conventional motors.

Within the scope of the above aim, a consequent primary object of the invention is to provide a motor which is compact and constructively solid.

Another important object is to provide an electric motor having a structure which is capable of providing good heat dissipation into the environment.

Another object of the invention is to provide a motor whose structure can integrate a plurality of components and therefore achieves considerable benefits in terms of simplicity of assembly.

Another object of the invention is to provide a motor having a structure which is competitive with respect to conventional motors also from the point of view of costs.

This aim and these and other objects which will become better apparent hereinafter are achieved by a permanent-magnet electric motor for circulation pumps of heating systems, comprising:

a stator composed of a pack of metallic laminations which form pole shoes to which electrical windings are coupled;

a permanent-magnet rotor, arranged in a chamber separated with a watertight seal and electrically insulated from the stator;

characterized in that said chamber that contains the rotor has a cross-section which duplicates the contour of the pole shoes in regions affected by said pole shoes and is shaped so as to form wider portions in regions that are not affected by said pole shoes.

Advantageously, the cross-section of said chamber that contains the rotor is substantially square, with central regions of the sides which widen in an arc-like shape.

BRIEF DESCRIPTION OF THE DRAWINGS

Further characteristics and advantages of the invention will become better apparent from the detailed description of some embodiments thereof, illustrated only by way of non-limitative example in the accompanying drawings, wherein:

FIG. 3 is a plan view of the chamber in which the rotor is placed;

FIG. 4 is a front view of the stator pole shoes with the respective windings;

FIG. 5 is an enlarged-scale perspective view of a detail of FIG. 4;

FIG. 6 is a general perspective view of the pole shoes of FIG. 4;

DESCRIPTION OF THE PREFERRED EMBODIMENTS

Figure 1:
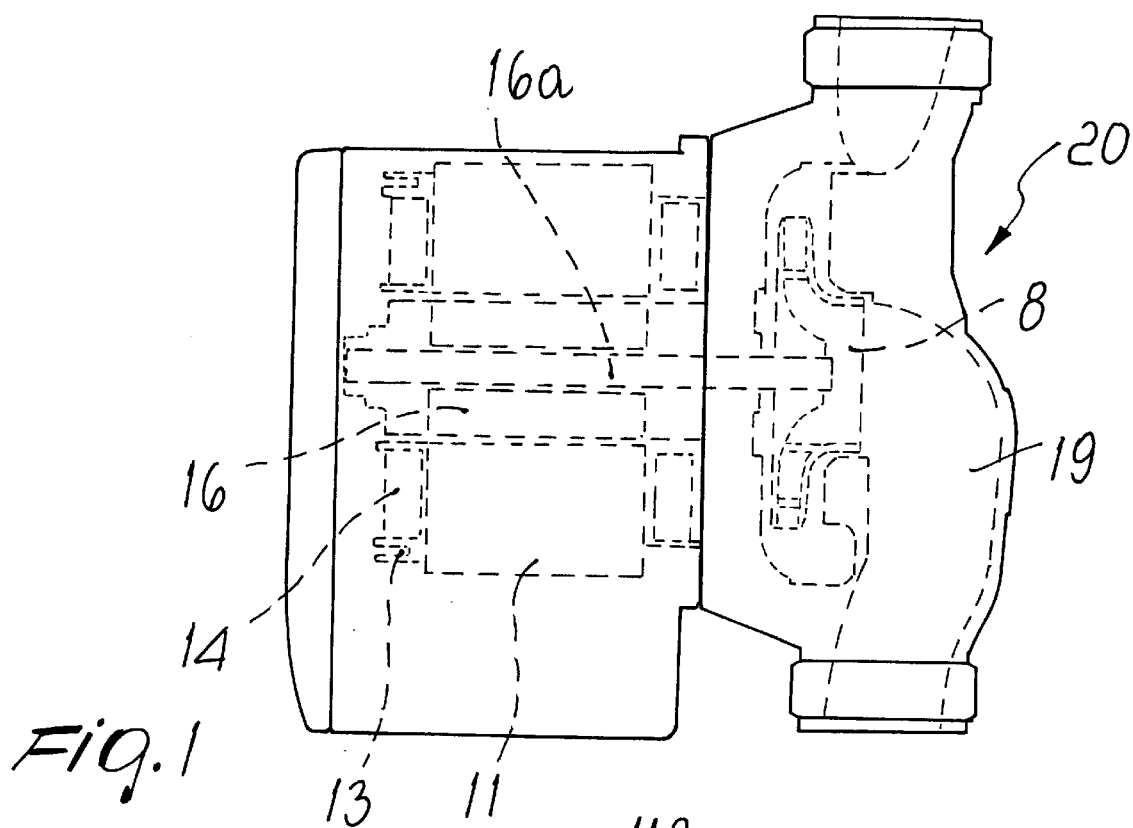
FIG. 1 is a side view of a circulation pump provided with the motor according to the invention in a first embodiment.
Figure 2:
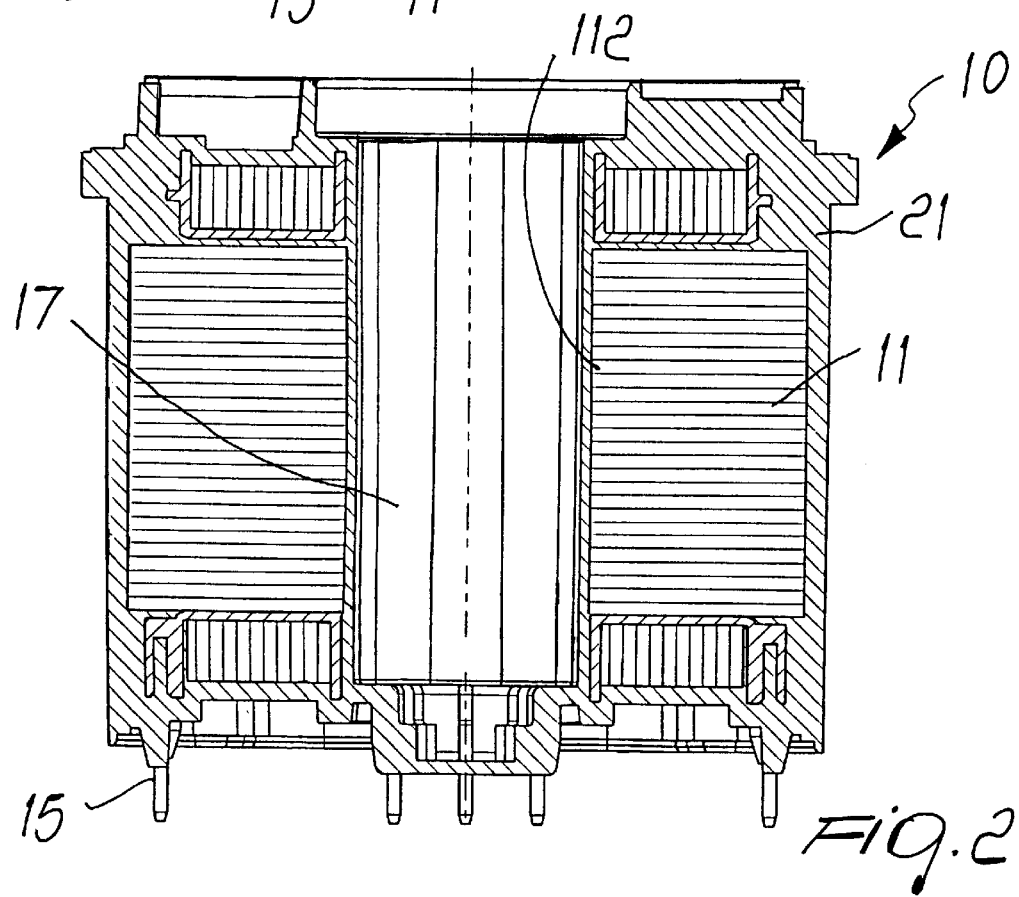
FIG. 2 is a sectional view, taken along a longitudinal plane, of the stator of the motor of FIG. 1.

With reference to the above cited FIGS. 1 to 6, a permanent-magnet electric motor for circulation pumps of heating systems having the structure according to the invention comprises, in a first embodiment, a stator 10 which is composed of a pack of metallic laminations 11 which form four pole shoes 12 arranged in a cross-shaped configuration; corresponding spools 13 made of plastic are coupled to the pole shoes and support respective windings 14, each of which is provided with electrical connection terminals 15.

The motor further comprises a permanent-magnet rotor 16 arranged in a chamber 17 which is separated with a watertight seal from the stator 10.

As shown in the figures, an impeller 8 is keyed at one end to a shaft 16a of the rotor 16, and is arranged in a volute 19 which is coupled to the motor so as to constitute a circulation pump 20.

At this point it should be noted that the lamination pack 11 and the spools 13 with the windings 14 are embedded and insulated in a plastic enclosure 21 which is molded in place and integrates a chamber 17 of the rotor 16.

As shown in the figures, the only elements protruding from the enclosure 21 are the electrical connection terminals 15.

Furthermore, the chamber 17 has a particular contour which duplicates the circular shape of the pole shoes 12 in regions 22 affected thereby and instead has wider portions 23 in the unaffected regions.

In practice, the cross-section of the chamber 17 is substantially square, with arc-shaped wider portions of the sides in the central regions.

In a permanent magnet synchronous motor it is in fact possible to widen the spaces in the regions not affected by the pole shoes, so as to increase the amount of fluid that can penetrate between the rotor 16 and the internal wall of the chamber 17 in order to increase the heat exchange between the fluid and the stator 10.

Reducing the amount of space in which the rotor 16 is adjacent to the chamber 17 also reduces the danger of jamming of the rotor 16 and facilitates the escape of any air bubbles which might have been trapped inside the chamber 17 of the rotor 16.

It should also be noted (see in particular FIGS. 3 and 4) that the spools 13 that support the windings 14 of the stator 10 have ends 24 located on the rotor side 16 which are each shaped so as to form a raised portion 25 at one side and a complementarily shaped recess 26 at the other side, so that in the cross-shaped arrangement they abut for mutual positioning so as to avoid movements during the injection-molding of the enclosure 21.

Figure 7:
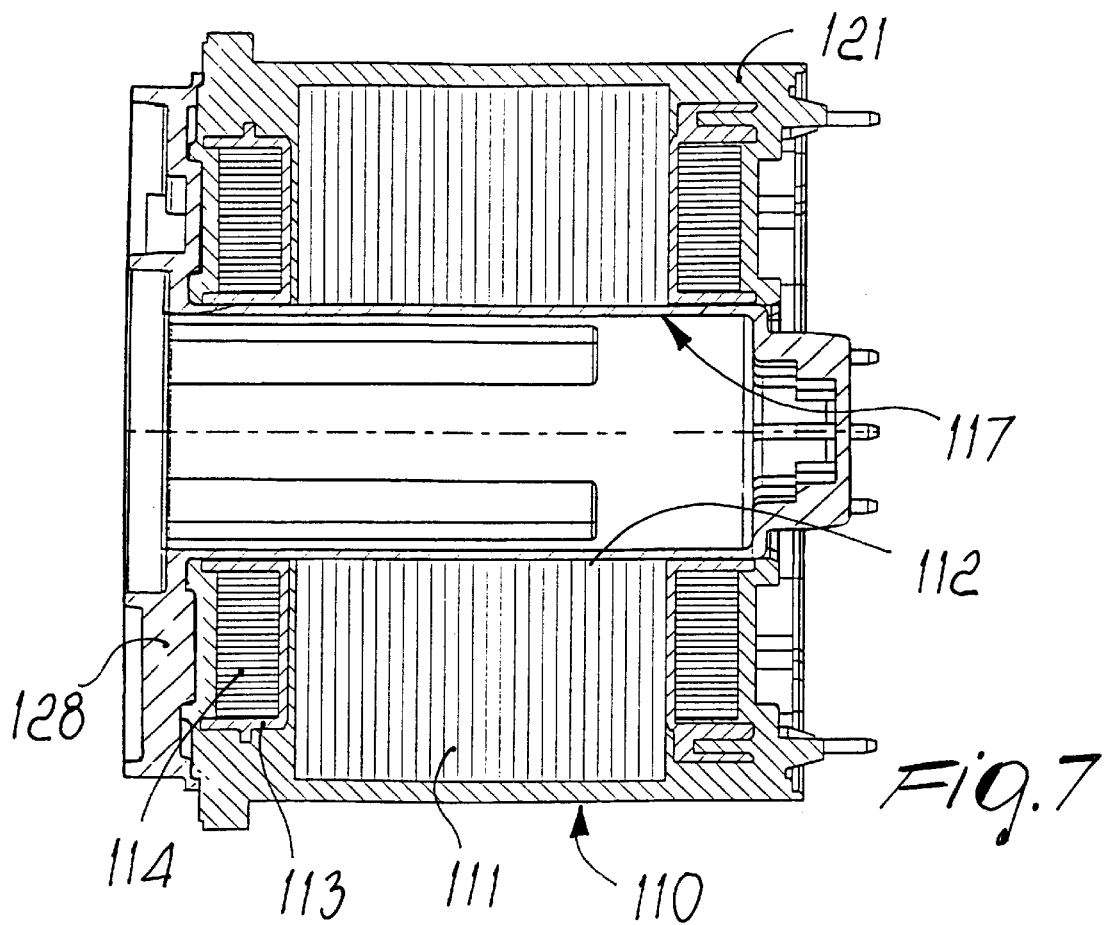
FIG. 7 is a sectional view, taken along a longitudinal plane, of the assembled stator in a second embodiment of the motor.
Figure 8:
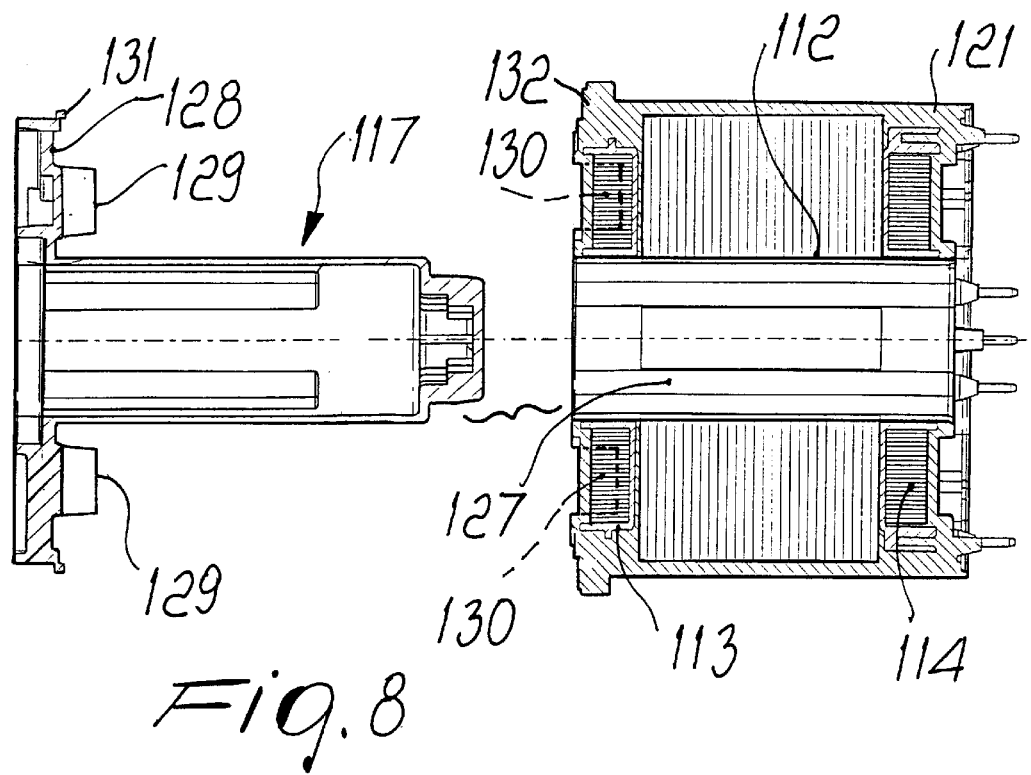
FIG. 8 is a sectional view of the components of the stator of FIG. 7.

With reference now to the above cited FIGS. 7 and 8, in a second embodiment the motor is again composed of a stator 110 with a pack of laminations 111 which form pole shoes 112 to which spools 113 are coupled for windings 114 with respective electrical connection terminal 115.

The rotor is again provided and is arranged in a chamber 117 which is separated with a watertight seal from the stator 110; in this case, however, the molded-in-place enclosure 121 which includes the pole shoes 112 and the electrical windings 114 does not integrate the rotor chamber, which is instead provided by means of a separate component 117 which is inserted in a corresponding space 127 and couples by interlocking with a flanged part 128 thereof provided with male tabs 129 to be inserted in adapted seats 130 of the enclosure 121.

The cross-section of the chamber 117 is equivalent to the cross-section of the already mentioned chamber 17.

Watertightness against possible infiltrations of water which might occur in the region for the coupling of an abutment 131 of the flange 128 and a plane 132 of the stator 110 (moisture, tube dripping, et cetera) can be ensured by ultrasound welding, gluing, or by providing a gasket.

The pole shoes 112 are thus protected.

Figure 9:
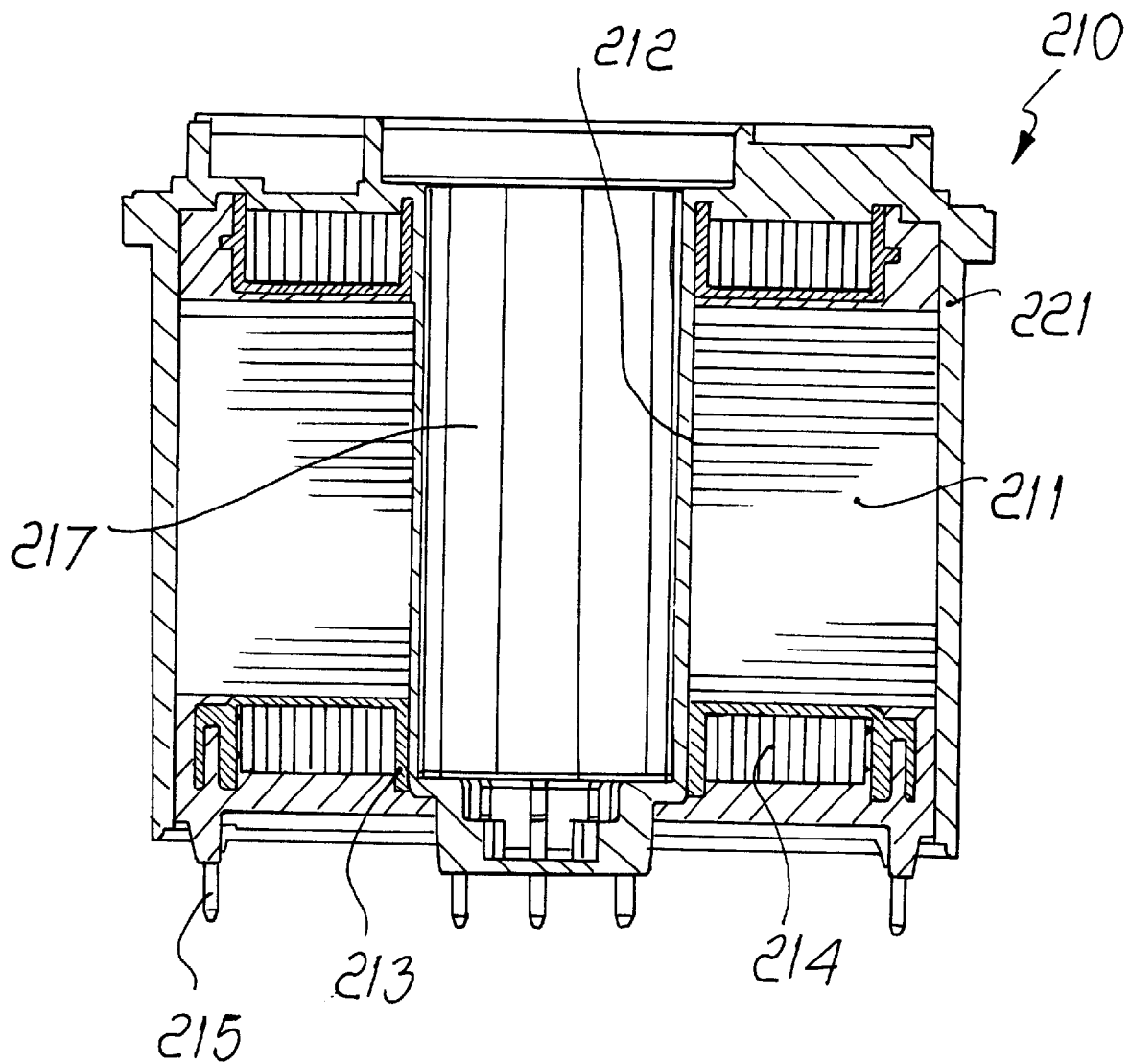
FIG. 9 is a sectional view, taken along a longitudinal plane, of the assembled stator in a third embodiment.

With reference to the above cited FIG. 9, in a third embodiment the motor is again composed of a stator 210 with a pack of laminations 211 which form pole shoes 212 to which spools 213 are coupled for windings 214 with respective electrical connection terminals 215.

The rotor is again provided and is arranged in a chamber 217 which is separated with a watertight seal from the stator 210.

It should be noted that the lamination pack 211 and the spools 213 with the windings 214 are embedded in an epoxy resin inside an enclosure 221 made of plastic, which integrates the chamber 217 of the rotor.

In practice it has been found that all the above embodiments of the electric motor for circulation pumps of heating systems achieve the intended aim and objects of the present invention.

The particular shape of the stator of the synchronous motor in fact allows to fully utilize the region of heat exchange between the rotor and the water that circulates in the rotor chamber, which is conveniently provided with a non-circular cross-section with a widened space for circulation of the fluid between the chamber and rotor.

The reduction of the regions in which the rotor is adjacent to the internal surface of the chamber reduces the possibility of jamming of the rotor due to dirt.

This fact, combined with a rotor/chamber clearance of approximately 0.5 mm, allows to eliminate the screw which is usually located on the side of the pump that is connected to the rotor chamber in conventional circulators and that, in case of jamming, is removed to allow the operator to act on the shaft (which has notched ends) with a screwdriver so as to release the rotor.

It should also be noted that the synchronous motor has a higher starting torque than the traditional asynchronous motor, so that if jamming unfortunately occurs, it has a better chance of overcoming the contrasting friction torque.

The enlargement of the space between the rotor and the chamber, in which the circulating fluid is usually at a pressure of $2/3$ bar in normal operating conditions, allows natural and almost automatic degassing, without requiring operations to be performed from the outside.

The motor, produced by means of a monoblock unit constituted by the molded-in-place stator, is furthermore particularly compact and strongly built; electrical insulation and resistance to moisture being also ensured.

The active parts of the motor, made of iron and copper, are electrically insulated from the water, since the part that constitutes the separator is made of plastics. It is therefore unnecessary to electrically ground the device.

The stator windings embedded in plastic without air gaps also produce good motor/environment heat dissipation.

Finally, attention is called to the possibility of integrating several components, with considerable benefits in terms of ease of assembly.

In particular, the terminals 15 of the windings 14 are kept perfectly in position in the mold, so that the control electronics can be assembled without particular techniques.

The invention thus conceived is susceptible of numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to requirements.

The disclosures in Italian Patent Application No. PD2000A000107 from which this application claims priority are incorporated herein by reference.

What is claimed is:

1. A permanent-magnet electric motor for circulation pumps of heating systems, comprising:
    a stator composed of a pack of metallic laminations which form pole shoes to which electrical windings are coupled;
    a permanent-magnet rotor, arranged in a chamber separated with a watertight seal and electrically insulated from the stator;
    wherein said chamber that contains the rotor has a cross-section which duplicates tile contour of the pole shoes in regions of said chamber affected by said pole shoes and is shaped so as to form wider portions in regions that are not affected by said pole shoes, and wherein said cross-section of said chamber that contains the rotor is substantially square, with arc-like wider portions in central regions of the sides.

2. The motor according to claim 1, wherein said metal lamination pack that forms the pole shoes and the corresponding electric windings are embedded and insulated in a plastic enclosure which is molded in place.

3. The motor according to claim 2, wherein said enclosure integrates said chamber in which said permanent-magnet rotor is arranged.

4. The motor according to claim 2, wherein said chamber in which said rotor is arranged is formed by a plastic component added to said enclosure that embeds said pack of laminations and the corresponding electrical windings, said additional component being assembled with said enclosure by interlocking.

5. The motor according to claim 4, wherein said plastic component forms said chamber in which the rotor is arranged and a flanged part which couples by interlocking with said enclosure.

6. The motor according to claim 5, wherein said plastic component is associated, with a hydraulic seal, with said flanged part by means of a gasket or by ultrasonic welding, gluing or equivalent methods.

7. The motor according to claim 5, wherein said plastic component is associated, with a hydraulic seal, with said flanged part by molding-in-place of said additional component with said stator.

8. The motor according to claim 5, wherein complementary male and female interlocking components are formed between said flanged part and said enclosure.

9. The motor according to claim 1, wherein said pack of laminations and the windings are embedded in an epoxy resin inside a plastic enclosure which integrates said rotor chamber.

10. The motor according to claim 1, wherein said windings are placed on four corresponding spools which are coupled to said pole shoes and are arranged in a cross-shaped configuration, wherein rotor-side ends of said spools have a raised portion at one side and a complementary recess at an other side for coupling and mutual positioning.

11. A permanent-magnet electric motor for circulation pumps of heating systems, comprising:
    a stator composed of a pack of metallic laminations which form pole shoes to which electrical windings are coupled;
    a permanent-magnet rotor, arranged in a chamber separated with a watertight seal and electrically insulated from the stator;
    wherein said chamber that contains the rotor has a cross-section which duplicates the contour of the pole shoes in regions of said chamber affected by said pole shoes and is shaped so as to form wider portions in regions that are not affected by said pole shoes and wherein said windings are placed on four corresponding spools which are coupled to said pole shoes and are ranged in a cross-shaped configuration, wherein rotor-side ends of said spools have a raised portion at one side and a complementary recess at an other side for coupling and mutual positioning.

12. The motor according to claim 11, wherein said cross-section of said chamber that contains the rotor is substantially square, with arc-like wider portions in central regions of the sides.

13. The motor according to claim 11, wherein said metal lamination pack that forms the pole shoes and the corresponding electric windings are embedded and insulated in a plastic enclosure which is molded in place.

14. The motor according to claim 13, wherein said enclosure integrates said chamber in which said permanent-magnet rotor is arranged.

15. The motor according to claim 13, wherein said chamber in which said rotor is arranged is formed by a plastic component added to said enclosure that embeds said pack of laminations and the corresponding electrical windings, said additional component being assembled with said enclosure by interlocking.

16. The motor according to claim 15, wherein said plastic component forms said chamber in which the rotor is arranged and a flanged part which couples by interlocking with said enclosure.

17. The motor according to claim 16, wherein said plastic component is associated, with a hydraulic seal, with said flanged part by means of a gasket or by ultrasonic welding, gluing or equivalent methods.

18. The motor according to claim 16, wherein said plastic component is associated, with a hydraulic seal, with said flanged part by molding-in-place of said additional component with said stator.

19. The motor according to claim 16, wherein complementary male and female interlocking components are formed between said flanged part and said enclosure.

20. The motor according to claim 11, wherein said pack of laminations and the windings are embedded in an epoxy resin inside a plastic enclosure which integrates said rotor chamber.

* * * * *